(12) United States Patent
Lim et al.

(10) Patent No.: US 11,285,777 B2
(45) Date of Patent: Mar. 29, 2022

(54) SEMI-ACTIVE STABILIZER DEVICE

(71) Applicant: DAEWON KANG UP CO., LTD., Chungcheongnamdo (KR)

(72) Inventors: Man Seung Lim, Gyeonggi-do (KR); Jin Woong Kim, Seoul (KR); Sang Eun Bae, Seoul (KR); In Sup Kim, Seoul (KR)

(73) Assignee: DAEWON KANG UP CO., LTD., Chungcheongnamdo (KR)

( * ) Notice: Subject to any disclaimer, the term of this patent is extended or adjusted under 35 U.S.C. 154(b) by 0 days.

(21) Appl. No.: 16/887,899

(22) Filed: May 29, 2020

(65) Prior Publication Data
US 2020/0376919 A1  Dec. 3, 2020

(30) Foreign Application Priority Data
May 31, 2019 (KR) .......................... 10-2019-0064419

(51) Int. Cl.
  *B60G 21/10* (2006.01)
  *B60G 21/055* (2006.01)
  *B60G 11/50* (2006.01)

(52) U.S. Cl.
  CPC ................. *B60G 21/106* (2013.01)

(58) Field of Classification Search
  CPC .............. B60G 21/106; B60G 2204/61; B60G 2500/22; B60G 2204/424; B60G 2204/45; B60G 2206/427; B60G 2202/135; B60G 2202/432; B60G 11/50; B60G 11/52; B60G 11/58; B60G 21/055; B60G 21/0553;
  (Continued)

(56) References Cited

U.S. PATENT DOCUMENTS

2016/0001620 A1* 1/2016 Mohrlock .......... B60G 21/0553
                                                        280/124.165
2020/0198435 A1* 6/2020 Dhanraj ............. B60G 21/0558

FOREIGN PATENT DOCUMENTS

JP      S60150116 U    10/1985
JP      2011031735 A    2/2011
(Continued)

OTHER PUBLICATIONS

Description Translation for KR2017/0086962 from Espacenet (Year: 2017).*
(Continued)

*Primary Examiner* — James A English
*Assistant Examiner* — Daniel M. Keck
(74) *Attorney, Agent, or Firm* — Tarolli, Sundheim, Covell Tummino LLP (57) ABSTRACT

The present disclosure relates to a semi-active stabilizer device which may adjust the rigidity of a stabilizer bar according to a traveling state of a vehicle, and may include a first stabilizer bar, a second stabilizer bar, an outer housing which has a hollow portion formed therein, an inner housing which is inserted into the hollow portion of the outer housing to rotate relatively, an elastic member which applies an elastic force so that the outer housing and the inner housing return to original positions thereof upon relative rotation, and a stopper which limits the inner housing to rotate relatively only within a certain angular range upon the relative rotation, thereby improving riding comfort upon traveling on a straight road, and improving traveling stability upon traveling on a curved road.

8 Claims, 10 Drawing Sheets

(58) Field of Classification Search
CPC ............ B60G 21/0558; B60G 2204/41; B60G 16/0165; B60G 17/02; F16F 1/028; F16F 1/12; F16F 1/38; F16F 1/3807; F16F 1/3814; F16F 1/3821; F16F 1/3828; F16F 1/3876

See application file for complete search history.

(56) References Cited

FOREIGN PATENT DOCUMENTS

| | | |
|---|---|---|
| KR | 20110056988 A | 5/2011 |
| KR | 20170086962 A | 7/2017 |

OTHER PUBLICATIONS

Korean Office Action for application No. 10-2019-0064419 dated Sep. 4, 2020.

* cited by examiner

SEMI-ACTIVE STABILIZER DEVICE

CROSS-REFERENCE(S) TO RELATED APPLICATIONS

This application claims priority to Korean Patent Application No(s). 10-2019-0064419, filed on May 31, 2019 the disclosure(s) of which is(are) incorporated herein by reference in its (their) entirety.

TECHNICAL FIELD

The present disclosure relates to a semi-active stabilizer device, and more particularly, to a semi-active stabilizer device which may adjust rigidity of a stabilizer bar according to a traveling state of a vehicle.

RELATED ART

Generally, a stabilizer bar used in a vehicle has a structure which extends laterally from a vehicle body, and is mounted by connecting left and right vehicle wheel sides to each other at the bottom of the vehicle.

Particularly, the stabilizer bar prevents outer vehicle wheels of the radial direction against a curved road from being separated from the ground due to the rolling generated in the vehicle body by the lateral acceleration caused by a centrifugal force when the vehicle travels on the curved road, thereby performing a function of securing traveling safety.

The stabilizer bar preferably has a high rigidity in terms of safety in order to prevent the vehicle from rolling over due to the rolling upon traveling on the curved road. However, when the vehicle travels on a straight road, it is preferable to minimize the transfer of the traveling load of the vehicle wheel to the vehicle body by the stabilizer bar in order to improve ride comfort.

That is, it is preferable that the rigidity of the stabilizer bar acts very slightly in a straight traveling situation within a predetermined angle with respect to a torsion angle of the stabilizer bar, and the rigidity of the stabilizer bar is adjusted to act largely at a predetermined angle or more.

A conventional stabilizer bar is generally produced by processes which cut a single round bar or a pipe material to an appropriate length, form the cut material into a required shape, and then perform heat treatment, short peening, painting, and the like.

As described above, the stabilizer bar made of a single material has advantages in that it is easy to manufacture and has a low production cost, but has a disadvantage in that the inherent rigidity constantly acts at all times, thereby not adjusting the rigidity.

Meanwhile, an active stabilizer bar, which divides a stabilizer bar into a left side and a right side and installs an actuator between the left side and the right side, has been developed and used.

The actuator has a manner of controlling the torsion of the stabilizer bar by converting electrical energy into a mechanical force by using an electric motor, a hydraulic motor, an electromagnet, or the like, and adjusts the rigidity of the stabilizer bar while rotating the left and right stabilizer bars in a direction opposite to the torsional direction.

Such an active stabilizer bar has an advantage of appropriately adjusting the rigidity of the stabilizer bar according to the situation, thereby improving traveling stability and ride comfort of the vehicle.

However, there are problems in that since such an active stabilizer bar has a complicated structure, the active stabilizer bar is not easy to manufacture, it is natural that a sensor and a control device are inevitably needed and thus manufacturing costs are high, and it is not easy to secure a space when the active stabilizer bar is installed to the vehicle due to the large volume of the actuator.

Further, it is necessary to adjust the rigidity of the stabilizer bar according to the road situation by previously determining the road condition which varies instantaneously when the vehicle travels to operate the actuator, but there is difficulty in the instantaneous operation of the actuator, that is, the response speed of actuator is slow, such that there is difficulty in actual application to the vehicle.

SUMMARY

The present disclosure is intended to solve the above problems, and an object of the present disclosure is to provide a semi-active stabilizer device, which operates so that a small rigidity acts when a vehicle travels on a straight road and a larger rigidity acts when the vehicle travels on a curved road.

For achieving the object, a semi-active stabilizer device according to a preferred exemplary embodiment of the present disclosure includes: a first stabilizer bar which has one side end connected to one side vehicle wheel of a vehicle; a second stabilizer bar which has one side end connected to the other side vehicle wheel of the vehicle; an outer housing which is fastened to the other side end of the first stabilizer bar to rotate together, and has a hollow portion formed therein; an inner housing which is fastened to the other side end of the second stabilizer bar to rotate together, and inserted into the hollow portion of the outer housing to rotate relatively; an elastic member which is disposed between the outer housing and the inner housing, and applies an elastic force so that the outer housing and the inner housing return to original positions thereof upon relative rotation; and a stopper which is provided in the outer housing, and limits the inner housing to rotate relatively only within a certain angular range upon the relative rotation.

Here, the stopper is provided to limit the relative rotation of the inner housing by selectively contacting stop surfaces, which are formed at both sides in a width direction, with the inner housing.

Further, a plurality of stoppers having different gaps between the stop surfaces may be provided, and a relatively rotatable angular range of the inner housing may be changed by replacing the stoppers with the stoppers having different gaps between the stop surfaces.

The outer housing may include: a first cover which is fastened to the other side end of the first stabilizer bar, and supports one side of the inner housing to be rotated; an outer housing body which has the center formed to penetrate so that the inner housing is inserted, is formed with a support part, the support part protruding from the inner surface inward along a longitudinal direction to support the elastic member and having the stopper fastened to both side ends in the longitudinal direction, and has one side surface fastened to the first cover; and a second cover which is fastened to the other side surface of the outer housing body, and supports the other side of the inner housing to be rotated.

Here, the outer housing body may further include a stopper fastening groove into which portions of both side edges of the stopper are inserted and fastened so that the stopper does not shake in a direction in which the inner housing rotates.

The inner housing may include: an inner housing body which is inserted into the outer housing to be supported to be rotated, and has the other side fastened to the other side end of the second stabilizer bar; a flange part which is formed to expand from both side ends of the inner housing body in a diameter smaller than the inner diameter of the outer housing, and is formed with a stopper groove into which the stopper is inserted to have a certain gap with a stop surface of the stopper; and an elastic member accommodating part which is formed in a groove shape on the inner housing body, and into which the elastic member is inserted to be supported.

Here, the elastic member accommodating part may include: a first elastic member accommodating part which is formed counterclockwise with respect to the support part, and a second elastic member accommodating part which is formed clockwise with respect to the support part, and the elastic member may also include: a first elastic member which is disposed in the first elastic member accommodating part and has a portion of the other side end supported to the support part, and a second elastic member which is disposed in the second elastic member accommodating part and has a portion of the other side end supported to the support part.

Further, the elastic member accommodating part may also include a fixing protrusion which protrudes toward the elastic member and has both side ends of the elastic member inserted therein, respectively, to prevent the elastic member from being separated.

Further, the support part may also include a support protrusion which protrudes toward the elastic member and has the other side end of the elastic member inserted therein when the elastic member is compressed.

Furthermore, the semi-active stabilizer device may further include a rotating support body which is disposed between the outer housing and the inner housing to support the relative rotation.

According to the semi-active stabilizer device according to the present disclosure, when the vehicle travels on the straight road, the small rigidity by the elastic force of the elastic member may act, thereby improving the ride comfort when the vehicle travels on the straight road, and when the vehicle travels on the curved road, the large rigidity by the stabilizer bar may act, thereby improving the traveling stability.

Further, according to the present disclosure, it is possible to apply the stabilizer bar having the rigidity larger than that of the conventional stabilizer bar, thereby further improving the traveling stability when the vehicle travels on the curved road.

DETAILED DESCRIPTION

In order to help understand the features of the present disclosure, a semi-active stabilizer device related to an exemplary embodiment of the present disclosure will be described in more detail below.

Further, in adding reference numerals to the components of each attached drawing in order to help understanding of the exemplary embodiments described below, it is noted that the same components have the same reference numerals as possible even though they are illustrated in different drawings. Further, in describing the present disclosure, when it is determined that detailed descriptions of related well-known structures or functions may obscure the gist of the present disclosure, detailed descriptions thereof will be omitted.

Hereinafter, specific exemplary embodiments of the present disclosure will be described with reference to the accompanying drawings.

Figure 1:
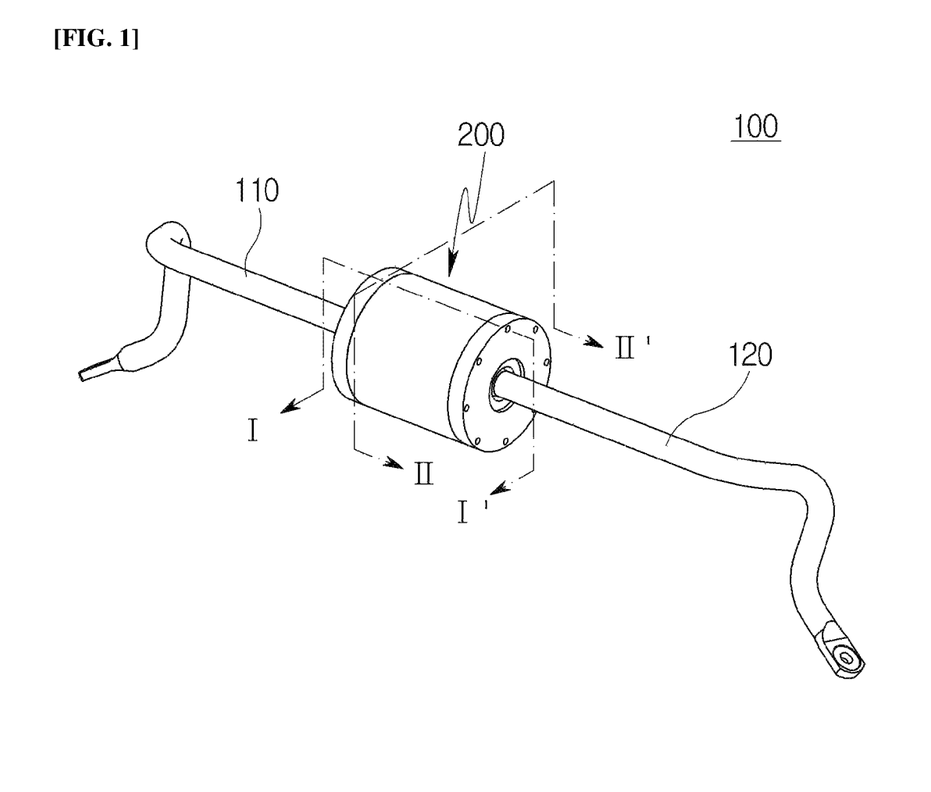
FIG. 1 is a perspective diagram schematically illustrating a semi-active stabilizer device according to an exemplary embodiment of the present disclosure.
Figure 2:
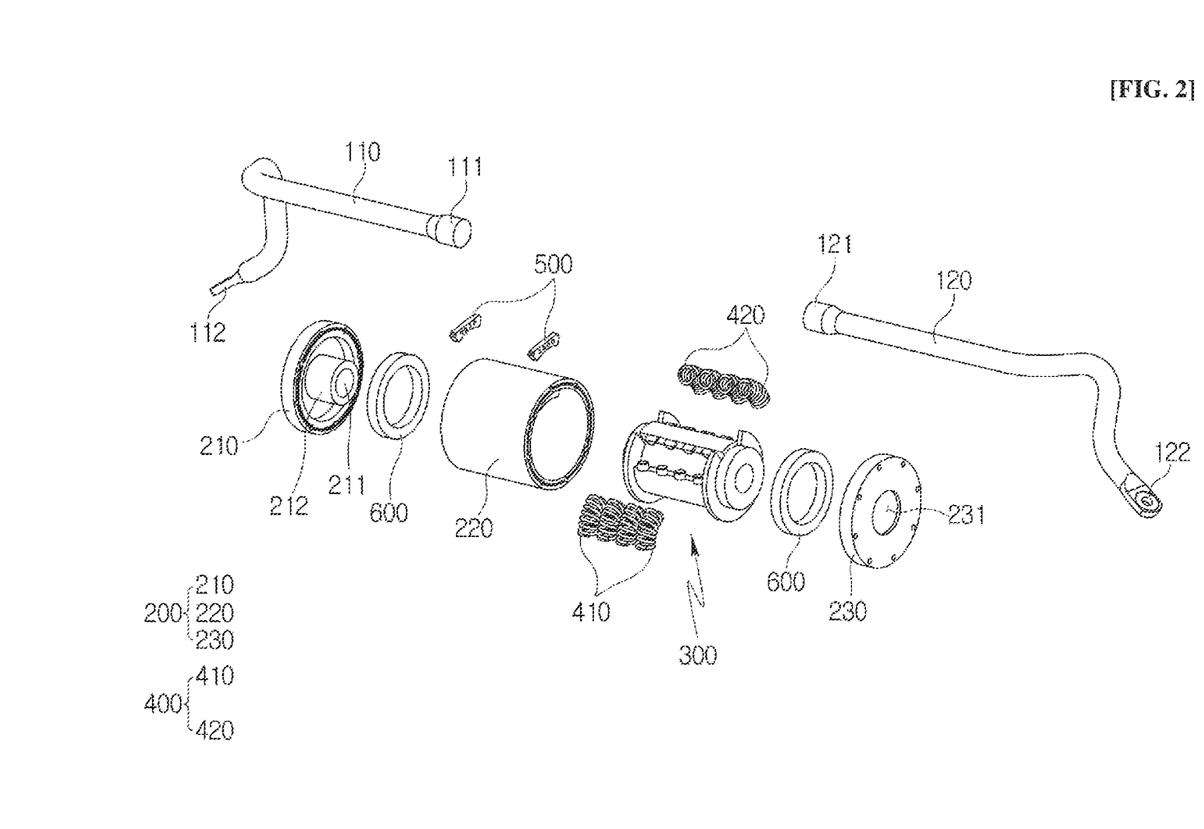
FIG. 2 is an exploded perspective diagram schematically illustrating the semi-active stabilizer device according to an exemplary embodiment of the present disclosure.
Figure 3:
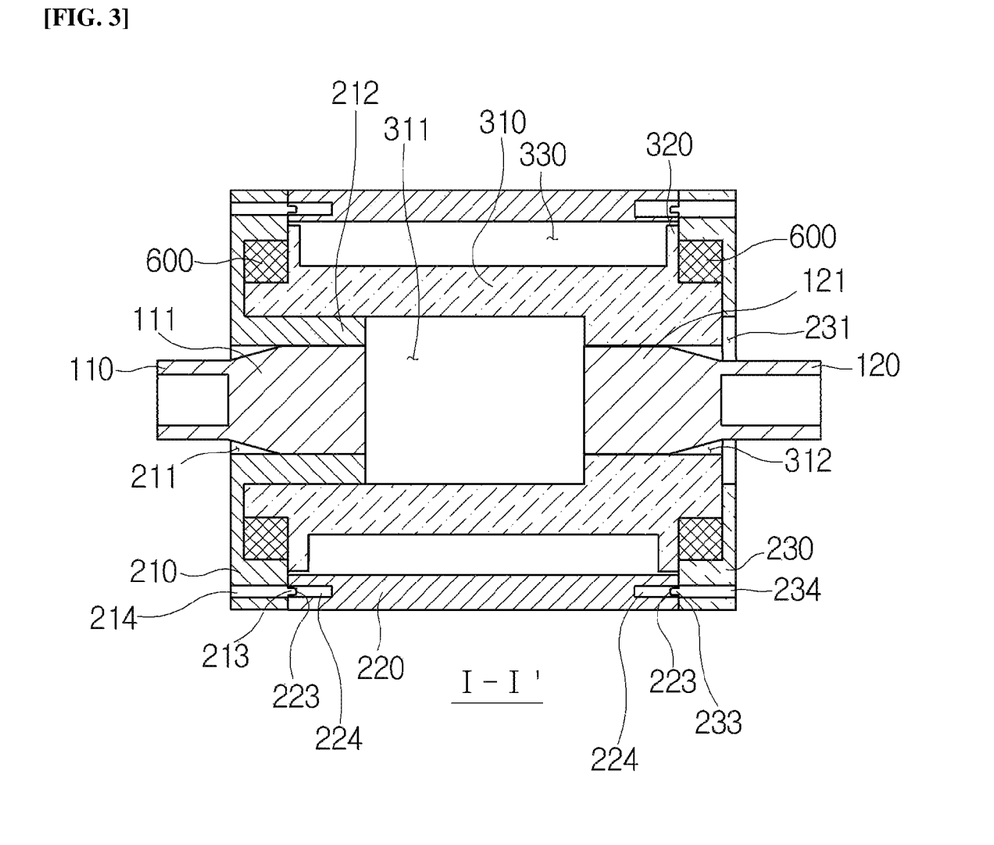
FIG. 3 is a cross-sectional diagram schematically illustrating a portion taken along the line I-I' of FIG. 1.
Figure 4:
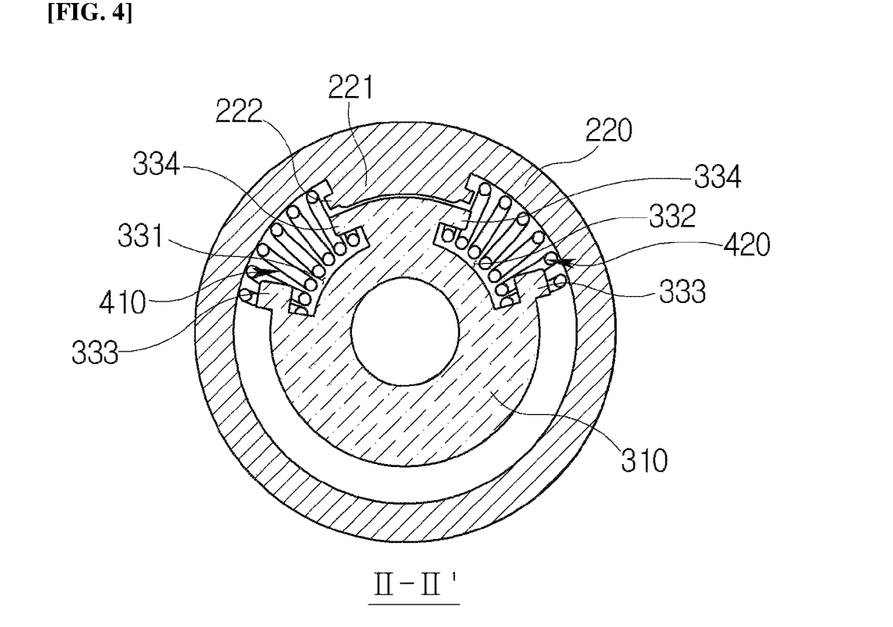
FIG. 4 is a cross-sectional diagram schematically illustrating a portion taken along the line II-IT of FIG. 1.
Figure 5:
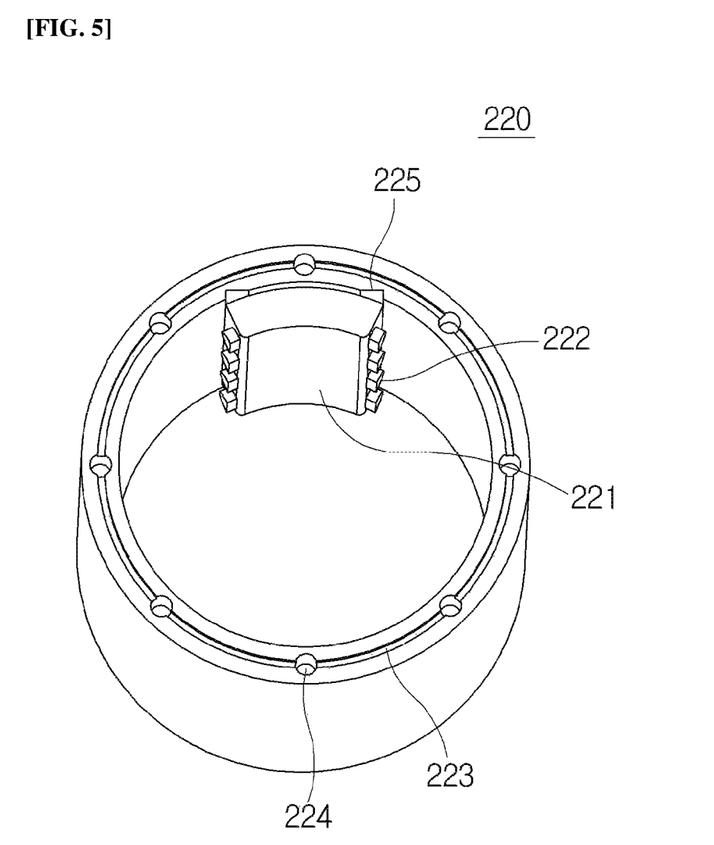
FIG. 5 is a perspective diagram schematically illustrating an outer housing body extracted from the semi-active stabilizer device according to an exemplary embodiment of the present disclosure.
Figure 6:
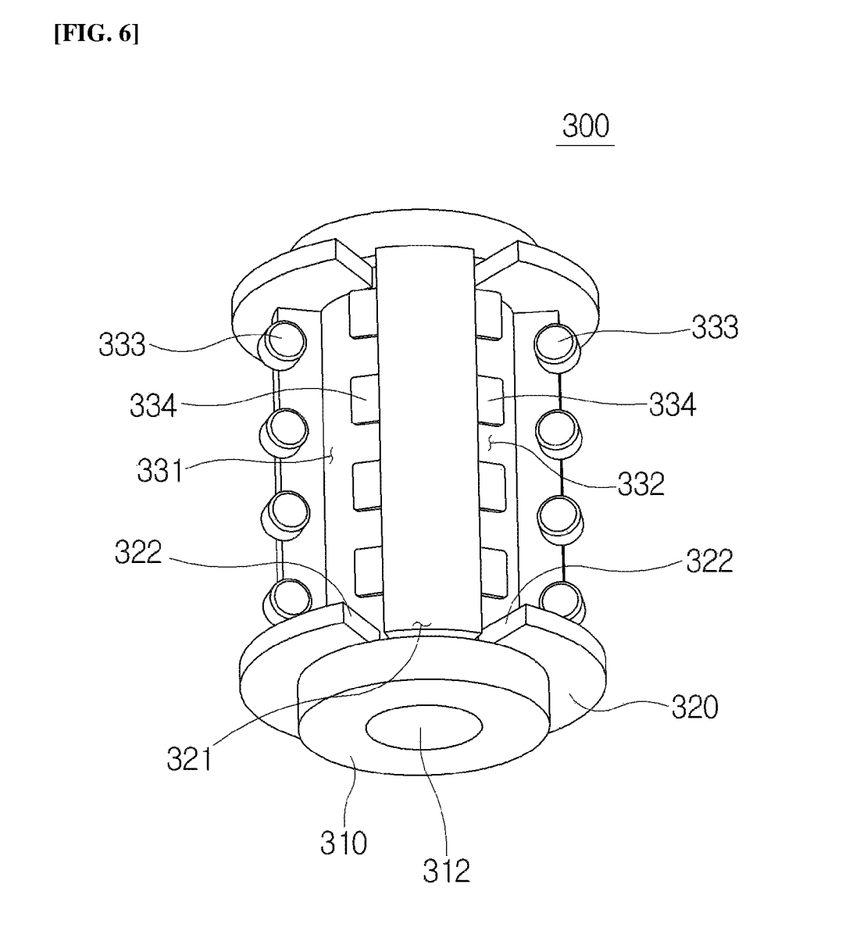
FIG. 6 is a perspective diagram schematically illustrating an inner housing extracted from the semi-active stabilizer device according to an exemplary embodiment of the present disclosure.
Figure 7:
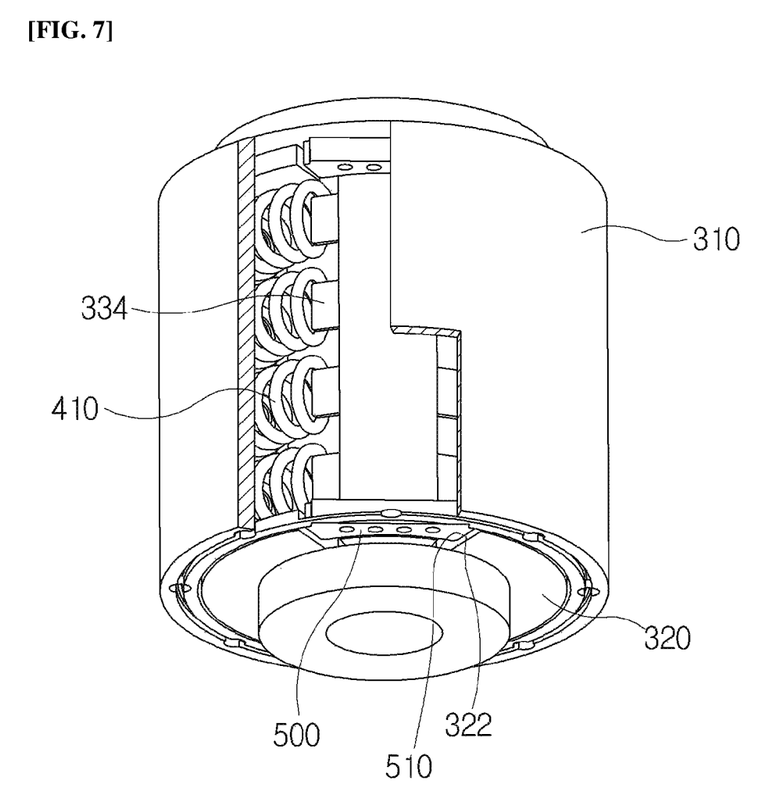
FIG. 7 is a perspective diagram schematically illustrating a portion which extracts and partially cuts a configuration where the inner housing, an elastic member, and a stopper are installed to the outer housing body in the semi-active stabilizer device according to an exemplary embodiment of the present disclosure.
Figure 8:
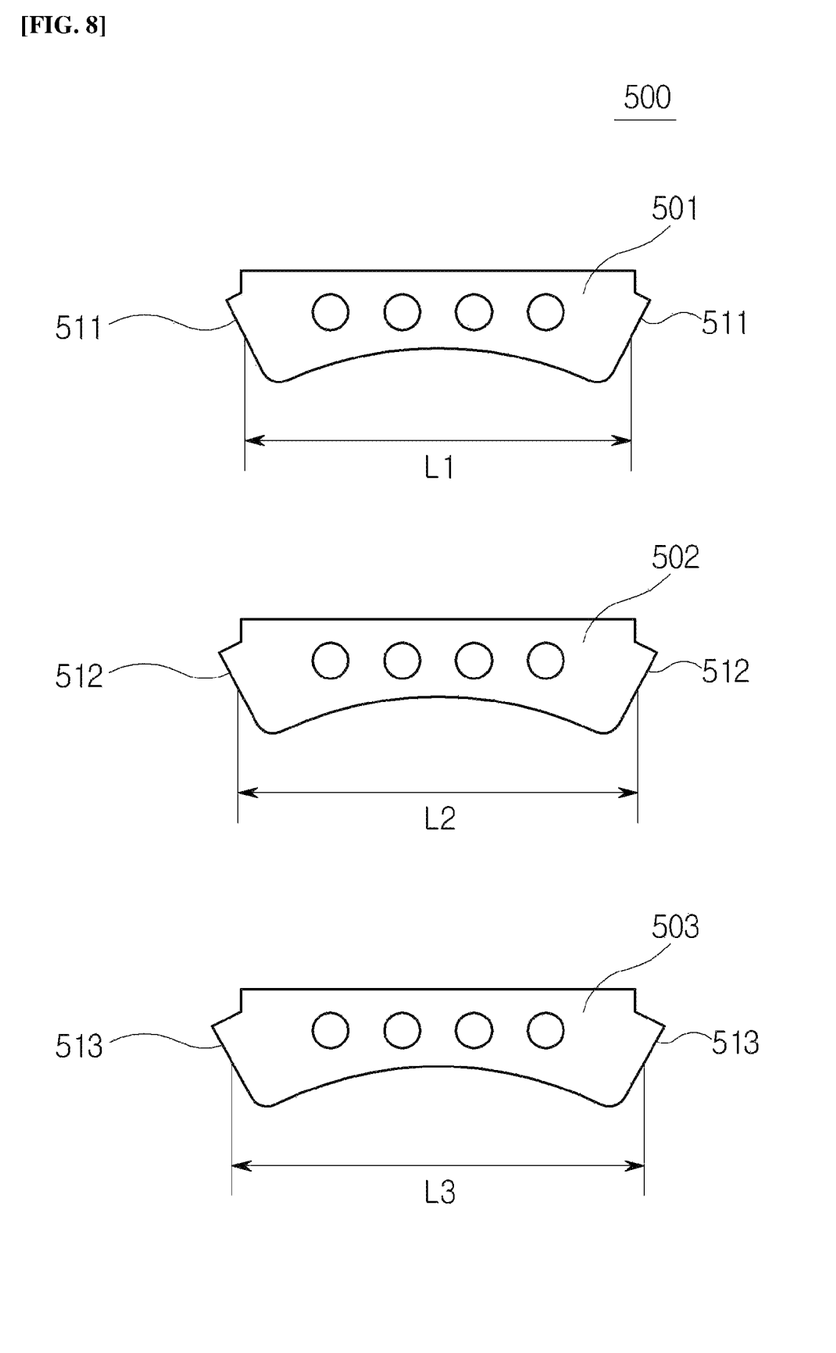
FIG. 8 is a diagram schematically illustrating various exemplary embodiments of the stopper in the semi-active stabilizer device according to an exemplary embodiment of the present disclosure.
Figure 9:
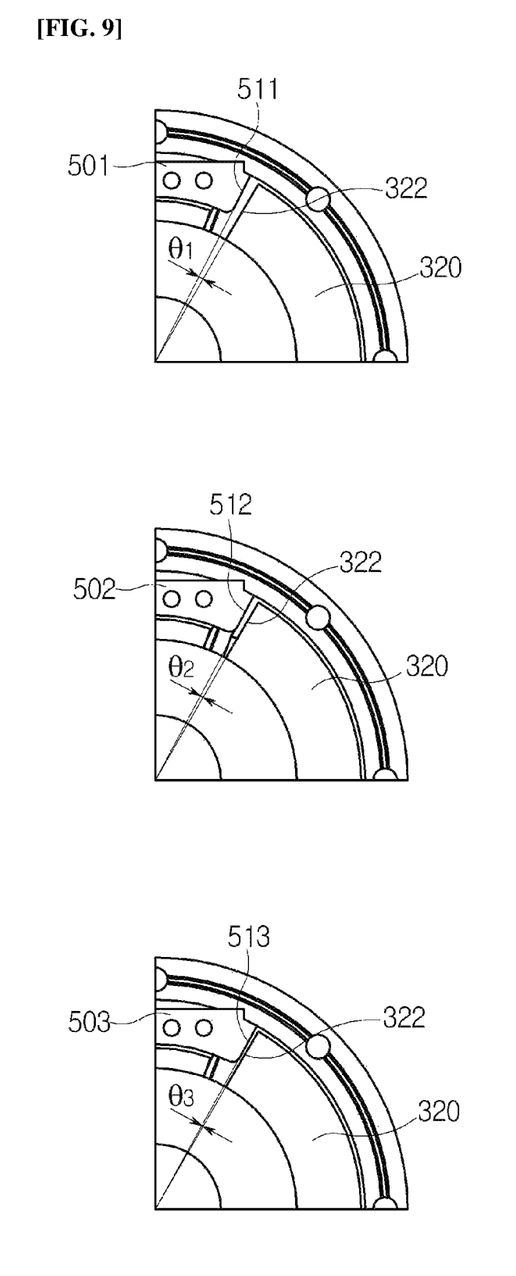
FIG. 9 is a diagram schematically illustrating a state where the stoppers of various exemplary embodiments are applied in the semi-active stabilizer device according to an exemplary embodiment of the present disclosure.

FIGS. 1 and 2 are a perspective diagram and an exploded perspective diagram schematically illustrating a semi-active stabilizer device according to an exemplary embodiment of the present disclosure, and FIGS. 3 and 4 are cross-sectional diagrams schematically illustrating portions taken along the lines I-I' and II-IT. Further, FIGS. 5 and 6 are perspective diagrams schematically illustrating an outer housing body and an inner housing extracted from the semi-active stabilizer device, and FIG. 7 is a perspective diagram schematically illustrating a portion which extracts and partially cuts a configuration where the inner housing, an elastic member, and a stopper are installed to the outer housing body. Furthermore, FIGS. 8 and 9 are diagrams schematically illustrating various exemplary embodiments of the stopper and a state where the stoppers are applied in the semi-active stabilizer device.

Referring to FIGS. 1 to 9, a semi-active stabilizer device 100 according to an exemplary embodiment of the present disclosure may operate so that a small rigidity by an elastic force of an elastic member acts when a vehicle travels on a straight road, and a large rigidity by a stabilizer bar acts when the vehicle travels on a curved road, thereby improving traveling stability when traveling on the curved road while improving ride comfort when the vehicle travels on the straight road.

To this end, a stabilizer bar is divided to produce a pair of stabilizer bars, and the stabilizer bar connected to a left vehicle wheel and the stabilizer bar connected to a right vehicle wheel are fastened to be rotated relatively to each other, and are rotated relatively to each other when relatively rotating at an angle smaller than a certain angle, that is, in a straight traveling section but are configured so that the elastic force of the elastic member acts. Further, when the stabilizer bars relatively rotate at the certain angle or more, that is, in a curved traveling section, the stabilizer bars are engaged with each other to rotate together in the same direction, thereby operating to prevent a rolling phenomenon of the vehicle by the rigidity of the stabilizer bar.

More specifically, the semi-active stabilizer device 100 includes a first stabilizer bar 110 which has one side end 112 connected to one side vehicle wheel of the vehicle, a second stabilizer bar 120 which has one side end 122 connected to the other side vehicle wheel of the vehicle, an outer housing 200 which is fastened to the other side end 111 of the first stabilizer bar 110 to rotate together and is formed with a hollow portion, an inner housing 300 which is fastened to the other side end 121 of the second stabilizer bar 120 to rotate together and is inserted to the hollow portion of the outer housing 200 to rotate relatively, an elastic member 400 which applies an elastic force so that the outer housing 200 and the inner housing 300 return to the original positions when rotating relatively, and a stopper 500 which limits the inner housing 300 to rotate relatively only within a certain angular range upon the relative rotation.

That is, in the semi-active stabilizer device 100 according to an exemplary embodiment of the present disclosure, the stabilizer bar is provided by being divided into two of the first stabilizer bar 110 and the second stabilizer bar 120: the first stabilizer bar 110 is fastened to one side vehicle wheel of the vehicle and the outer housing 200, and the second stabilizer bar 120 is fastened to the other side vehicle wheel of the vehicle and the inner housing 300 to rotate relatively within a certain angular range.

Here, a section where the first stabilizer bar 110 and the second stabilizer bar 120 rotate relatively is a first rigidity section in which the rigidity is very low, as a section to which the elastic force of the elastic member 400 is applied, and a section where the relative rotation is limited out of the certain angular range is a second rigidity section where the first stabilizer bar 110 and the second stabilizer bar 120 are constrained to rotate together and thus the rigidity acts largely.

The outer housing 200 is fastened to the other side end 111 of the first stabilizer bar 110 to rotate together with the first stabilizer bar 110, and the inner housing 300 is inserted into and disposed in the hollow portion.

The outer housing 200 includes a first cover 210 which is fastened to the other side end 111 of the first stabilizer bar 110 and supports one side of the inner housing 300 to be rotated, an outer housing body 220 which has the inner housing 300 inserted, supports elastic member 400, and has one side surface fastened to the first cover 210, and a second cover 230 which is fastened to the other side surface of the outer housing body 220 and supports the other side of the inner housing 300 to be rotated.

More specifically, the first cover 210 is provided in a disc shape to be fastened to an opened one side surface of the outer housing body 220, and the other side end 111 of the first stabilizer bar 110 is inserted into and fastened to a first stabilizer bar fastening groove 211 formed in the center to rotate together with the first stabilizer bar 110.

Further, the first cover 210 has an inner housing support protrusion 212, which is formed to protrude from the center inward from the outer housing body 220, inserted into the inner housing 300 to support the inner housing 300 to be rotated.

The outer housing body 220 is provided in a tube shape having the center penetrated so that the inner housing 300 is inserted to be rotated, and the first cover 210 and the second cover 230 are fastened to both opened side surfaces to be closed.

Further, the outer housing body 220 is formed with a support part 221 which protrudes from the inner surface inward along a longitudinal direction, that is, toward the inner housing 300. The support parts 221 are radially spaced apart from the inner housing 300 not to be constrained to each other, circumferentially support the elastic member 400, and are formed to have the stoppers 500 fastened to both side ends in the longitudinal direction.

Further, the outer housing body 220 is formed with a stopper fastening groove 225 into which portions of both side edges 520 of the stopper 500 are inserted and fastened so that the stopper 500 does not shake in a direction in which the inner housing 300 rotates. That is, since the stopper 500 is a configuration which applies a load so that the outer housing 200 and the inner housing 300 rotate together by contacting the inner housing 300 when the outer housing 200 and the inner housing 300 rotate outside a certain angular range, the stopper fastening groove 225 is a configuration which supports the stopper 500 to accurately transfer the load without shaking in the rotational direction.

The second cover 230 is provided in a disc shape to be fastened to the opened other side surface of the outer housing body 220, and provided so that the second stabilizer bar 120 penetrates and is inserted into a second stabilizer bar through-hole 231 formed in the center so that the outer housing 200 and the inner housing 300 rotate relatively without being constrained to each other.

Furthermore, in order to easily fasten the first cover 210 and the second cover 230 to the outer housing body 220, the first and second covers 210, 230 are formed with guide protrusions 213, 233 and bolt inserting grooves 214, 234 along the circumferential direction, and correspondingly, both side surfaces of the outer housing body 220 are formed with guide slits 223 and bolt fastening grooves 224 along the circumferential direction.

With such a configuration, when the first and second covers 210, 230 are in close contact with both side surfaces of the outer housing body 220, the guide protrusions 213, 233 of the first and second covers 210, 230 may be inserted into the guide slits 223 formed in the outer housing body 220 to easily align the center, thereby performing the assembly. Further, a bolt (not illustrated) may be inserted into the bolt inserting grooves 214, 234 formed in the first and second covers 210, 230 and then inserted into the bolt fastening groove 224 formed in the outer housing body 220 to be screw-fastened.

Accordingly, when the first stabilizer bar 110 rotates, the first cover 210 rotates together, and the outer housing body 220 fastened to the first cover 210 rotates together, such that the first stabilizer bar 110 is configured to rotate integrally with the outer housing 200.

The inner housing 300 is a configuration which is fastened to the other side end 121 of the second stabilizer bar 120 to rotate together, inserted into the hollow portion of the outer housing 200 to rotate relatively with the outer housing 200 within a certain angular range, and constrained to the stopper 500 when the inner housing 300 is outside the certain angular range to rotate in the same direction as the outer housing 200.

The inner housing 300 is composed of an inner housing body 310, a flange part 320, and an elastic member accommodating part 330.

More specifically, the inner housing body 310 is provided in a cylindrical shape to be inserted into the outer housing 200 to be rotated, and configured so that the inner housing support protrusion 212 is inserted into a support protrusion inserting groove 311, which is formed to penetrate the center, to be supported to rotate on one side surface thereof, and the other side end 121 of the second stabilizer bar 120 is inserted into and fastened to the second stabilizer bar fastening groove 312, which is formed to penetrate the center to rotate together with the second stabilizer bar 120 on the other side surface thereof.

The flange part 320 is formed to expand radially from both side ends of the inner housing body 310, but is formed to have a diameter smaller than the inner diameter of the outer housing 200 so as not to contact the outer housing 200, and is formed with a stopper groove 321 so that the stopper 500 is inserted to have a certain gap with a stop surface 510 of the stopper 500. That is, when the stopper 500 is positioned in the stopper groove 321 and the inner housing 300 rotates outside the certain angular range, the end surface 322 of the flange part 320 contacts the stop surface 510 of the stopper 500 to constrain the relative rotation, and the outer housing 200 and the inner housing 300 rotate together.

The elastic member accommodating part 330 is formed in a groove shape in the inner housing body 310, and the elastic member 400 is inserted into and supported by the elastic member accommodating part 330.

The elastic member accommodating part 330 includes a first elastic member accommodating part 331 which is formed counterclockwise with respect to the support part 221 formed on the outer housing body 220, and a second elastic member accommodating part 332 which is formed clockwise with respect to the support part 221.

That is, since the vehicle may travel on the curved road to the left or the right, the inner housing 300 may rotate clockwise or counterclockwise with respect to the outer housing 200.

Accordingly, the elastic member 400 is provided as a pair of the first elastic member 410 and the second elastic member 420, and provided so that the first elastic member 410 is disposed in the first elastic member accommodating part 331 and a portion of the other side end of the first elastic member 410 is supported by the support part 221, and the second elastic member 420 is disposed in the second elastic member accommodating part 332 and a portion of the other side end of the second elastic member 420 is supported by the support part 221.

Furthermore, the elastic member accommodating part 330 may be formed with a fixing protrusion which protrudes toward the elastic member 400 and into which both side ends of the elastic member 400 are inserted, respectively, to prevent the elastic member 400 from being separated.

Here, the fixing protrusion is formed on both the first elastic member accommodating part 331 and the second elastic member accommodating part 332, and a first fixing protrusion 333 is formed at the side adjacent to the support part 221 and a second fixing protrusion 334 is formed at the side away from the support part 221 in the first and second elastic member accommodating parts 331, 332.

Accordingly, the elastic member 400 may have both side ends inserted into the first fixing protrusion 333 and the second fixing protrusion 334, respectively, thereby being stably positioned without being separated from the elastic member accommodating part 330.

Further, the support part 221 may also be formed with a support protrusion 222 which protrudes toward the elastic member 400 and has the other side end of the elastic member 400 inserted therein when the elastic member 400 is compressed. However, when the inner housing 300 is inserted into the outer housing 200, the support protrusion 222 is formed to have a length at which the support protrusion 222 does not contact the other side end of the elastic member 400 which is inserted into the elastic member accommodating part 330 of the inner housing 300. That is, when the inner housing 300 is inserted into and fastened to the outer housing 200, the support protrusion 222 is spaced not to contact the elastic member 400, but when the elastic member 400 is compressed by the relative rotation, the other side end of the elastic member 400 is inserted into the support protrusion 222.

Furthermore, since the first fixing protrusion 333 has a structure which is inserted into the other side end of the elastic member 400 together with the support protrusion 222, and the first fixing protrusion 333 and the support protrusion 222 are formed to have semicircular cross sections, respectively, such that the first fixing protrusion 333 and the support protrusion 222 are formed to have circular cross sections together. Further, since the second fixing protrusion 334 singly supports one side end of the elastic member 400, the second fixing protrusion 334 is formed of a protrusion having a circular cross section so that the elastic member 400 is fitted and fastened.

Further, a rotating support body 600 which is disposed between the outer housing 200 and the inner housing 300 to support the relative rotation may be further provided. The rotating support body 600 is provided in a pair of bearings, outer wheels are fitted into and fastened to the first cover 210 and the second cover of the outer housing 200, respectively, and the inner housing body 310 of the inner housing 300 is fitted into and fastened to inner wheels, respectively, to support the outer housing 200 and the inner housing 300 to rotate relatively.

The stopper 500 is inserted into and fastened to the stopper fastening groove 225 of the outer housing body 220 to be positioned at both side ends in the longitudinal direction of the support part 221 which is formed on the outer housing body 220, and limits the inner housing 300 to rotate relatively only within the certain angular range upon the relative rotation.

That is, the stoppers 500 are spaced apart from each other so that the stop surfaces 510 formed at both sides in the width direction have certain gaps from both side end surfaces 322 of the flange part 320 of the inner housing 300, limit the relative rotation of the inner housing 300 by the contact between the end surface 322 of the flange part 320 and the stop surface 510 when the inner housing 300 rotates relatively, and constrains the inner housing 300 and the outer housing 200 to rotate together and thus the first stabilizer bar 110 and the second stabilizer bar 120 rotate together, thereby suppressing the rolling.

At this time, there are problems in that when the gap between the end surface 322 of the flange part 320 and the stop surface 510 of the stopper 500 increases, the vehicle enters the second rigidity section belatedly even when entering the curved traveling section, thereby degrading curved traveling stability, and when the gap is narrowed, the vehicle enters the second rigidity section in the straight traveling section, thereby degrading riding comfort.

As described above, since all of the inflection time points for entering the second rigidity section may vary depending on the type of vehicle, it is preferable to identify the optimal inflection time point for each vehicle through performance evaluation, and to fasten the stopper suitable for the vehicle.

Accordingly, the present disclosure may provide a plurality of stoppers having different gaps between the stop surfaces, and replace the stoppers with the stoppers having different gaps between the stop surfaces to change the relatively rotatable angular range between the outer housing 200 and the inner housing 300 to change the inflection time point when the vehicle enters the second rigidity section.

As an example, as illustrated in FIG. 8, three stoppers having different gaps between the stop surfaces are provided. A first stopper 501 is formed so that an gap (L1) between stop surfaces 511 is smaller than an gap (L2) between stop surfaces 512 of the second stopper 502, and a third stopper 503 is formed so that an gap (L3) between stop surfaces 513 is smaller than the gap (L2) between the stop surfaces 512 of the second stopper 502.

As described above, when the stoppers having different gaps between the stop surfaces are applied, as illustrated in FIG. 9, an angle ($\theta_1$) between the stop surface 511 of the first stopper 501 and the end surface 322 of the flange part 320 is formed larger than an angle ($\theta_2$) between the stop surface 512 of the second stopper 502 and the end surface 322 of the flange part 320. That is, the semi-active stabilizer device to which the first stopper 501 is applied is longer in the inflection time point entering the second rigidity section than the semi-active stabilizer device to which the second stopper 502 is applied.

Further, the angle ($\theta_2$) between the stop surface 512 of the second stopper 502 and the end surface 322 of the flange part 320 is formed larger than an angle ($\theta_3$) between the stop surface 513 of the third stopper 503 and the end surface 322 of the flange part 320. That is, the semi-active stabilizer device to which the second stopper 502 is applied is longer in the inflection time point entering the second rigidity section than the semi-active stabilizer device to which the third stopper 503 is applied.

Accordingly, when the optimal inflection time point which enters the second rigidity section is set depending upon the type of vehicle, a semi-active stabilizer device, in which the stopper may be replaced correspondingly, thereby achieving optimal traveling convenience and stability, may be provided.

Since the conventional stabilizer bar is provided with one stabilizer bar to apply a constant rigidity at all times, the conventional stabilizer bar sets the rigidity of the stabilizer bar in consideration of both convenience upon traveling on the straight road and stability upon traveling on the curved road, such that it is difficult to apply the stabilizer bar having the large rigidity in consideration of the convenience upon traveling on the straight road.

However, the semi-active stabilizer device according to an exemplary embodiment of the present disclosure may decrease the rigidity of the stabilizer bar in the straight traveling section to minimize the influence of the stabilizer bar, thereby increasing the rigidity of the stabilizer bar in the second rigidity section as compared to the rigidity of the conventional stabilizer bar, thereby further improving stability in the curved traveling section.

Figure 10:
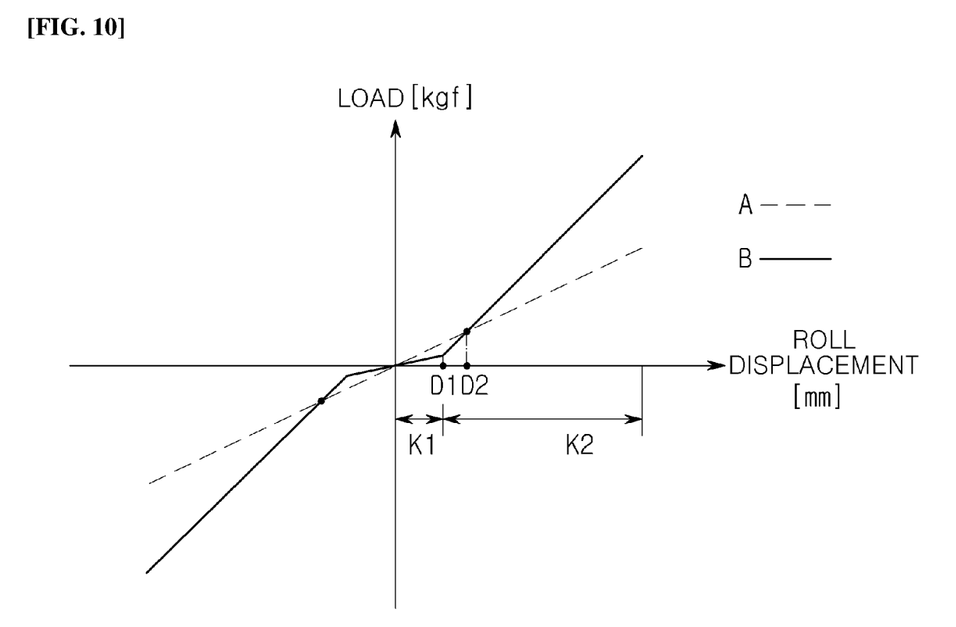
FIG. 10 is a graph comparing changes in the applied loads according to roll displacements between a conventional stabilizer bar and the semi-active stabilizer device according to an exemplary embodiment of the present disclosure.

FIG. 10 is a graph comparing changes in the applied loads according to roll displacements between a conventional stabilizer bar and a semi-active stabilizer device according to an exemplary embodiment of the present disclosure.

Here, the roll displacement represents the displacement which moves in the vertical direction of one side end of the stabilizer bar connected to the vehicle wheel, and the applied load represents a change in the load applied to the stabilizer bar according to the roll displacement.

As illustrated in FIG. 10, a conventional stabilizer bar (A) is provided with one stabilizer bar and the vehicle wheels are connected to both side ends, respectively, such that when the roll displacement changes, the load changes proportionally.

In comparison, a semi-active stabilizer device (B) according to the present disclosure has a very low rigidity in a first rigidity section ($K_1$) to which only the elastic force of the elastic member is applied up to a $D_1$ roll displacement, and when the $D_1$ roll displacement is exceeded, the rigidity acts largely in a second rigidity section ($K_2$) in which the first stabilizer bar and the second stabilizer bar are constrained to rotate together.

Here, when the rigidities of the first and second stabilizer bars according to the present disclosure are larger than the rigidity of the conventional stabilizer bar, in the stabilizer bar according to the present disclosure, the change in the load acts largely against the roll displacement in the second rigidity section ($K_2$) as compared to the conventional stabilizer bar, such that the applied load is reversed when a $D_2$ roll displacement is exceeded.

Accordingly, when the vehicle travels in a steep curved section and thus the roll displacement acts largely, that is, when the $D_2$ roll displacement is exceeded, the semi-active stabilizer device according to the present disclosure may suppress the rolling phenomenon more stably as compared to the conventional stabilizer bar.

As described above, although the present disclosure has been described by a limited number of exemplary embodiments and drawings, it is natural that the present disclosure is not limited thereto and various modifications and changes may be made within the technical spirit of the present disclosure and the appended claims by those skilled in the art to which the present disclosure pertains.

What is claimed is:

1. A semi-active stabilizer device comprising:
    a first stabilizer bar which has one side end connected to one side vehicle wheel of a vehicle;
    a second stabilizer bar which has one side end connected to the other side vehicle wheel of the vehicle;
    an outer housing which is fastened to the other side end of the first stabilizer bar to rotate together, and has a hollow portion formed therein;
    an inner housing which is fastened to the other side end of the second stabilizer bar to rotate together, and inserted into the hollow portion of the outer housing to rotate relatively;
    an elastic member which is disposed between the outer housing and the inner housing, and applies an elastic force so that the outer housing and the inner housing return to original positions thereof upon relative rotation; and
    a stopper which is provided in the outer housing, and limits the inner housing to rotate relatively only within a certain angular range upon the relative rotation,
    wherein the stopper limits the relative rotation of the inner housing by selectively contacting stop surfaces, which are formed at both sides in a width direction, with the inner housing, and
    wherein a plurality of stoppers having different gaps between the stop surfaces are provided, and a relatively rotatable angular range of the inner housing is changed by replacing the stoppers with the stoppers having different gaps between the stop surfaces.

2. The semi-active stabilizer device of claim 1, wherein the outer housing comprises:

a first cover which is fastened to the other side end of the first stabilizer bar, and supports one side of the inner housing to be rotated;

an outer housing body which has a center formed to penetrate so that the inner housing is inserted, is formed with a support part, the support part protruding from the inner surface inward along a longitudinal direction to support the elastic member and having the stopper fastened to both side ends in the longitudinal direction, and has one side surface fastened to the first cover; and a second cover which is fastened to the other side surface of the outer housing body, and supports the other side of the inner housing to be rotated.

3. The semi-active stabilizer device of claim 2, wherein the outer housing body further comprises a stopper fastening groove into which portions of both side edges of the stopper are inserted and fastened so that the stopper does not shake in a direction in which the inner housing rotates.

4. The semi-active stabilizer device of claim 2, wherein the inner housing comprises:

an inner housing body which is inserted into the outer housing to be supported to be rotated, and has another side fastened to the other side end of the second stabilizer bar;

a flange part which is formed to expand from both side ends of the inner housing body in a diameter smaller than the inner diameter of the outer housing, and is formed with a stopper groove into which the stopper is inserted to have a certain gap with a stop surface of the stopper; and an elastic member accommodating part which is formed in a groove shape on the inner housing body, and into which the elastic member is inserted to be supported.

5. The semi-active stabilizer device of claim 4, wherein the elastic member accommodating part comprises: a first elastic member accommodating part which is formed counterclockwise with respect to the support part, and a second elastic member accommodating part which is formed clockwise with respect to the support part, and wherein the elastic member comprises: a first elastic member which is disposed in the first elastic member accommodating part and has a portion of the other side end supported to the support part, and a second elastic member which is disposed in the second elastic member accommodating part and has a portion of the other side end supported to the support part.

6. The semi-active stabilizer device of claim 4, wherein the elastic member accommodating part comprises a fixing protrusion which protrudes toward the elastic member and has both side ends of the elastic member inserted therein, respectively, to prevent the elastic member from being separated.

7. The semi-active stabilizer device of claim 6, wherein the support part comprises a support protrusion which protrudes toward the elastic member and has the other side end of the elastic member inserted therein when the elastic member is compressed.

8. The semi-active stabilizer device of claim 1, further comprising a rotating support body which is disposed between the outer housing and the inner housing to support the relative rotation.

* * * * *